United States Patent
Crooks et al.

(10) Patent No.: US 10,326,943 B2
(45) Date of Patent: Jun. 18, 2019

(54) OVERHEAD CAMERA SYNCHRONIZATION

(71) Applicant: NCR Corporation, Duluth, GA (US)

(72) Inventors: John Crooks, Duluth, GA (US); Andrew Jeremy Adamec, Buford, GA (US); Mark Allen Rambler, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 79 days.

(21) Appl. No.: 15/472,974

(22) Filed: Mar. 29, 2017

(65) Prior Publication Data
US 2018/0288300 A1  Oct. 4, 2018

(51) Int. Cl.
| | | |
|---|---|---|
| *H04N 5/77* | (2006.01) | |
| *H04N 5/235* | (2006.01) | |
| *H04N 7/18* | (2006.01) | |
| *G06Q 20/20* | (2012.01) | |
| *H04N 9/82* | (2006.01) | |

(52) U.S. Cl.
CPC ......... *H04N 5/2352* (2013.01); *G06Q 20/208* (2013.01); *H04N 5/77* (2013.01); *H04N 7/181* (2013.01); *H04N 9/8205* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,246,483 B1* | 6/2001 | Smith | .................. | G01B 11/162 356/35.5 |
| 6,845,190 B1* | 1/2005 | Smithwick | ........... | A61B 1/0008 385/1 |
| 2009/0161181 A1* | 6/2009 | Xu | ........................ | H04N 1/113 358/505 |
| 2010/0059589 A1* | 3/2010 | Goncalves | ......... | G06K 9/00771 235/383 |
| 2013/0134217 A1* | 5/2013 | Crooks | ................ | G06K 7/0004 235/440 |
| 2014/0187967 A1* | 7/2014 | Wood | ................... | A61B 5/0071 600/473 |
| 2016/0093204 A1* | 3/2016 | Chou | ............... | G08B 13/19645 340/501 |

* cited by examiner

*Primary Examiner* — Behrooz M Senfi
(74) *Attorney, Agent, or Firm* — Schwegman, Lundberg & Woessner (57) ABSTRACT

Various embodiments herein each include at least one of systems, devices, methods, and software for overhead camera synchronization, such as with regard to a camera positioned above a POS terminal or other kiosk terminal type. One embodiment in the form of a method includes adjusting at least one of an exposure setting of an imaging device and lighting within a field of view of the imaging device to affect an exposure within an image captured by the imaging device. This method further includes capturing an image with the imaging device with the at least one of the exposure setting of the imaging device and the lighting within the field of view of the imaging device to achieve a desired exposure within the captured image.

18 Claims, 6 Drawing Sheets

OVERHEAD CAMERA SYNCHRONIZATION

BACKGROUND INFORMATION

Point-of-Sale (POS) terminals have become reliant on imaging device, or camera, based barcode reading. But the presence of cameras has also given rise to further demands for images captured thereby for what is becoming many purposes. As a result, imaging is creating significant demands at POS terminals for processing capability. At the same time, different processes that receive and process images may desire or require different image parameters or properties, such as with regard to illumination, resolution, image size, and the like. While certain parameters and properties may be manipulated from virtually any captured image, others may not be.

SUMMARY

Various embodiments herein each include at least one of systems, devices, methods, and software for overhead camera synchronization, such as with regard to a camera positioned above a POS terminal or other kiosk terminal type.

One embodiment in the form of a method includes adjusting at least one of an exposure setting of an imaging device and lighting within a field of view of the imaging device to affect an exposure within an image captured by the imaging device. This method further includes capturing an image with the imaging device with the at least one of the exposure setting of the imaging device and the lighting within the field of view of the imaging device to achieve a desired exposure within the captured image.

Another embodiment, in the form of a system, includes a product scanner including at least one imaging device and a light-field that illuminates a scan-area. The system further includes an overhead imaging device to be positioned to provide an overhead view of the scan-area of the product scanner and a control module that controls operation of the product scanner and the overhead imaging device by performing data processing activities. The data processing activities of the control module may include adjusting at least one of an exposure setting of the overhead imaging device and lighting of the product scanner light-field to affect an exposure within an image captured by the overhead imaging device. The data processing activities may further include capturing an image with the overhead imaging device with the at least one of the exposure setting of the overhead imaging device and the lighting produced by the product scanner light-field to achieve a desired exposure within the captured image.

DETAILED DESCRIPTION

Various embodiments herein each include at least one of systems, devices, methods, and software for overhead camera synchronization, such as with regard to a camera positioned above a POS terminal or other kiosk terminal type.

Many applications exist and more are being developed for POS and kiosk terminals (e.g., teller assisted and self-service terminals) that utilize an external overhead-view camera situated above a work area, such as over a scan-field of a product scanner. Such an overhead camera may be, for example, a remote video-over-Ethernet camera, USB camera, and the like. Images from the camera may be used for various purposes such as automated fraud and theft detection, security monitoring and recording, teller assistance in identifying presented items such as produce, and the like. Unfortunately, product scanners often broadcast intense pulsed illumination to improve conditions for scanning with imaging devices that disrupts conventional overhead cameras. Such intense pulsed illumination renders overhead cameras virtually useless for most applications as the images are often under or over exposed and certainly not consistent between frames to enable utilization for many purposes. The various embodiments herein include systems, method, devices, and software to eliminate this disruption by synchronizing the overhead camera with the illumination in the work area, such as within a scan-field of an imaging scanner.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
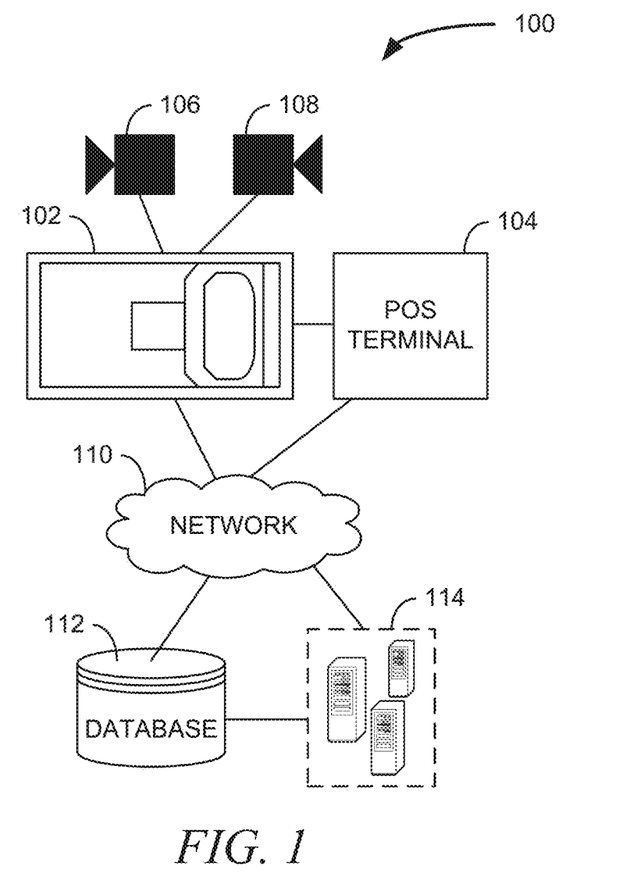
FIG. 1 is a logical block diagram of a system including a scanner, according to an example embodiment.

FIG. 1 is a logical block diagram of a system 100 including a scanner, according to an example embodiment. The system 100 is an example of deployment in a retail environment, although the various embodiments herein are also applicable to other environments, such as customer service kiosks and library checkouts, travel check-in kiosks, among others.

The system 100 includes a scanner 102 coupled to a terminal 104. The scanner 102 may be a product scanner or similar scanning device in some embodiments. An example of such a scanner is the REALSCAN 7879 BI-OPTIC IMAGER available from NCR Corporation of Duluth, Ga. Such modern scanners utilize one or more cameras in performing their scanning functions. Some such scanners even have four or more cameras included therein. Additional cameras may also be coupled to or otherwise be in communication with the scanner 102 or the terminal 104, such as a camera that may be mounted on a pole on the ceiling to provide an overhead view of one or both of the terminal 104 and scanner 102 areas. As such, these cameras may be utilized to capture images of many things including items presented for scanning or weighing, an area around the terminal, a cashier at the terminal 104 or a neighboring terminal, customers at the terminal 104 or in line, and other areas.

The terminal 104 may be a modern cash register serviced by a checkout clerk or cashier, or it can be a self-checkout terminal or other Self-Service Terminal (SST), customer service kiosk, and the like. In some embodiments, the scanner 102 is coupled, via either wired or wireless connections, to one or more additional cameras, such as cameras 106, 108. However, various embodiments may include one camera, three, four, and even more cameras. In some embodiments, the camera 106 may be pointed in the direction of a customer presenting items to purchase and documents to complete a purchase transaction at the terminal 104. Similarly, the camera 108 may be pointed in the direction of a terminal 104 clerk. Other cameras, such as cameras integrated within the scanner 102 may be directed toward a scan field of the scanner 102 to capture images of barcodes, watermarks embedded within product packaging (e.g., DIGIMARC), and the environment around the scanner 102 and terminal 104.

The system 100 also typically includes a network 110 that connects one or both of the scanner 102 and the terminal 104 to other computing devices. The other computing devices may include one or more transaction processing systems 114, one or more databases 112 that may store transaction, product, and other related data, depending on the particular embodiment. The network 110 may also provide a connection to a security video-over-Ethernet storage, viewing, and monitoring system that receives images and video from the cameras 106, 108 and the scanner 102 cameras deployed at the terminal 104.

Figure 2:
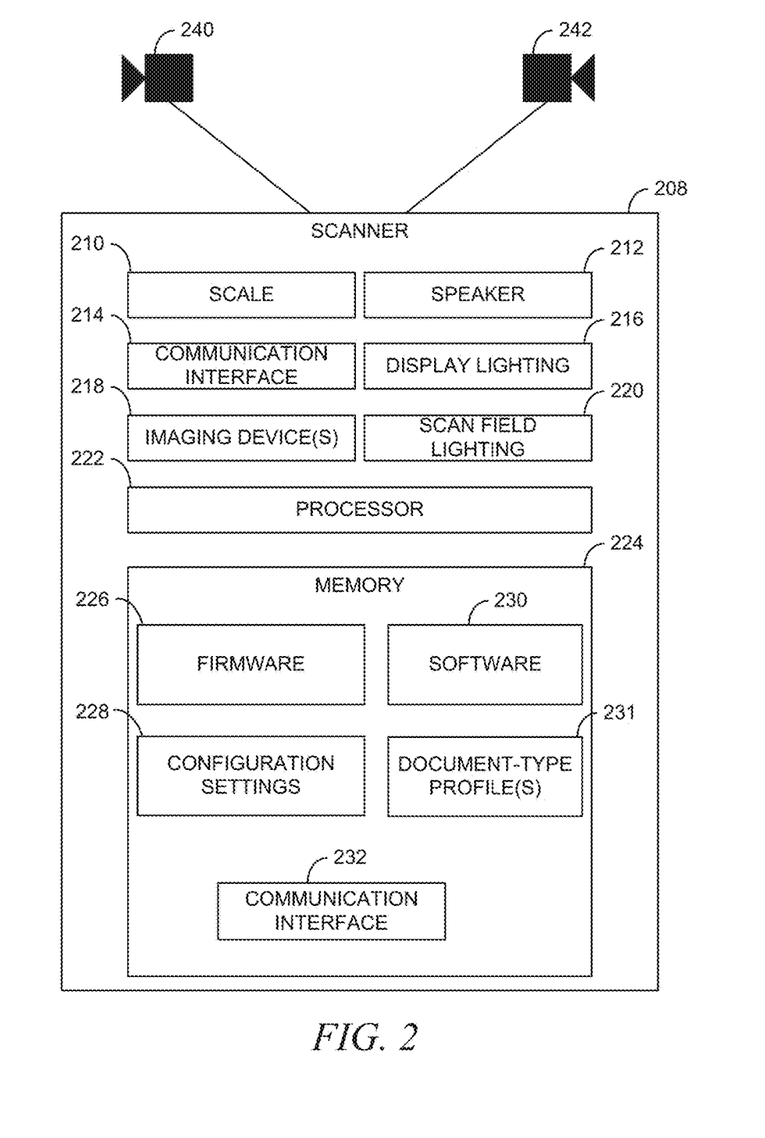
FIG. 2 is a diagram illustrating components of a scanner that may be deployed at a checkout station such as a POS terminal, self-service terminal (SST), or other kiosk system including a scanner, according to an example embodiment.

FIG. 2 is a diagram illustrating components of a scanner 208 that may be deployed at a checkout station such as a POS terminal, self-service terminal (SST), or other kiosk system including a scanner 208, according to an example embodiment. It is to be noted that the scanner 208 is shown schematically in greatly simplified form, with example components relevant to understanding various embodiments herein. Note that the scanner 208 may include more or fewer components in some embodiments.

Furthermore, the various components included in the FIG. 2 as illustrated and arranged are provided for illustration purposes only. It is to be noted that other arrangements with more or fewer components are possible without departing from the contributions herein.

Moreover, the methods and scanner 208 presented herein and below may include all or some combination of the components described and shown in the various contexts herein. Further, although the scanner 208 may be paired with a POS terminal, the scanner 208 may be a standalone element or an element of other systems, devices, and terminals in other embodiments. Examples of other terminal-types that may include a scanner 208 are SSTs, clerk operated and self-service library checkout stations, time-keeping terminals, and the like. Additionally, although a scanner is illustrated in FIG. 2 according to some embodiments, the in-scanner image sorting and processing described herein may also be implemented with regard to images and video streams generated by other devices, such as standalone cameras, such as one or more of cameras 240, 242 that may be coupled either directly or indirectly via USB or a network to the scanner 208.

The methods of some embodiments are programmed as executable instructions in memory and/or non-transitory computer-readable storage media and executed on one or more processors associated with the components and devices herein. For example, some embodiments may be deployed as firmware present within the scanner 208, such as firmware 226. In other embodiments, the in-scanner image sorting and processing functions may be deployed as software on the scanner or network deployed service accessible by the scanner. In other embodiments, the image sorting and processing may be performed on a computer controlling a POS terminal to which the scanner 208 is coupled, on a network server, or on a combination of two or more of the scanner 208, the computer controlling the POS terminal to which the scanner 208 is coupled.

The scanner 208 may be referred to herein as a product scanner or barcode scanner as that is the task most commonly associated with such devices. During operation, items are placed within a scan field of the scanner 208. One or more imaging devices 218 of the scanner 208, such as one or more cameras, then scan a barcode and information read therefrom is communicated to a POS system. The POS system then uses that data to identify the item placed within the scan field of the scanner 208 and performs an additional function. The additional function may include a price lookup and addition of the item to a list of items to be purchased, which may be presented on the one or more POS displays. The additional function may also include identifying a scanned product as a controlled item for which an age, identity, and/or address validation must be performed. A message may be presented on the one or more POS displays and a message may also be sent to the scanner 208 indicating an identification card or other document is to be scanned. Other additional functions may also be performed in different embodiments.

The scanner 208 may include one or more scan fields, such as two scan fields of bi-optic scanners that are commonly seen in grocery and discount retail outlets. In addition to the imaging devices 218, the scanner 208 may include various other components. The various other components may include an integrated scale 210 such as may be used in a grocery outlet to weigh produce and one or both of a speaker 212 and display lighting 216 to output audio and visual signals such as signals of (un)successful scans. The scanner 208 may also include scan field lighting 220 that may be turned on and off and adjusted based on a detected presence of an item to be scanned. The scan field lighting 220 may include one, two, or more different light colors, such as white, red, green, infrared, and possibly others. Additionally, scan field lighting 220 may be of variable intensity or brightness in some embodiments and be varied by applying different electric potentials to the lighting elements or adjusting a number of lighting elements, such as LEDs, that are illuminated.

During typical operation, the scanner 208 is operated according to instructions executed on a processor 222. The processor 222 may be an application specific integrated circuit (ASIC), a field programmable gate array (FPGA), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), secure memory, and other memory and data storage types and devices.

The instructions as may be stored in firmware 226 or as software 230 in memory 224 are executed according to configuration settings stored in the memory 224. The configuration settings 228 configure operation of the scanner 208 and the various components therein. For example, the configuration settings 208 may configure speaker 212 volume, display lighting 216 outputs, and scan field lighting 220 brightness. The configuration settings may also configure decoding algorithms of the imaging device(s) 218 and the instructions, one or more communication protocols used to communicate data from the scanner 208 to a POS system or other system via wired or wireless connections, and scale 210 operating parameters (e.g., unit of measure as pounds or kilograms). The configuration settings may also configure other settings of the particular scanner 208 an embodiment may include. In some embodiments, the configuration settings 228 may include a firmware version, a software version, and the like. Thus, when a configuration is set or updated, the setting or updating of the configuration settings 228 may include population and updates of any of the configuration settings 228 of a particular embodiment, including an update to firmware and software present on the scanner.

The scanner 208 may include one or more communication interfaces 214, 232 that enable the scanner 208 to communicate via one or both of wired and wireless connections over a network and with other computing devices. In some embodiments, the communication interface 232 may provide a virtualized communication connection on the scanner 208 that enables the scanner to communicate over a network leveraging network connectivity of a terminal or other computing device with which the scanner is paired, such as a POS terminal.

During operation, the one or more imaging devices 218 of the scanner 208 capture images, such as still images and frames of video. These still images and video may be stored within the memory 224 or other data storage device of the scanner 208, a terminal or other device paired therewith, or transmitted via one of the communication interface 214, 232 over a network. In other embodiments, the video is simply captured and processed on the scanner 208 and discarded. However, in some circumstances, certain images are needed, such as images of documents presented for payment, identity verification, for security video recording (e.g., ONVIF video-over-Ethernet, UVC over USB) and the like. In such instances, these images are processed according to instructions stored in software 230, firmware 226, or by passing such images to POS terminal controlling computer or a network service via one of the communication interface 214, 232 for appropriate processing.

In some embodiments, the scanner 208 includes four internal imaging devices 218 and a remote customer scanner (RCS) that communicates with the scanner 208 over a wire or wirelessly. The scanner 208 may be connected to a POS terminal via USB and to an ONVIF NVR (network video recorder) via the communication interface 214 to an Ethernet network.

The processing in some embodiments, from a general perspective, includes the scanner 208 imaging devices 218 and other cameras 240, 242 capturing images utilizing a diversity of camera exposure, illumination, resolution, cropping, color modes, positions, and times. The software 230 or firmware 226 of the scanner may then process and sort the diversity of images to suit each of a number of desired services. Optionally, to reduce processing load, the scanner 208 may process and sort images in a centralized task to minimize duplication of processor 222 usage. The scanner 208 then presents the processed and sorted images to each of the desired services for further action.

In some such embodiments, the scanner 208 captures images utilizing a diversity of camera 218, 240, 242 exposure, illumination, resolution, cropping, color modes, position, and time. In some such embodiments, a camera 218, 240, 242 control process communicates with the cameras 218, 240, 242, for example by I2C interface, to control and coordinate individual camera 218, 240, 242 behaviors. Also, the different cameras 218, 240, 242 can be color or monochrome, or include a variable output option that allows one or more of the cameras 218, 240, 242 to output a color or monochrome image.

Time diversity in some embodiments may be periodic or event driven, such as upon detection of an event by a scanner 208 process, such as movement in a camera 218, 240, 242 field of view after a POS terminal or the scanner 208 entering an idle state.

In some embodiments, the scanner 208 processes and sorts the diversity of images to suit each of the desired scanner services. Processing and sorting can be done in software 230, firmware 226 that may reside on the scanner 208, on a connected POS terminal, on a server, or on a hybrid combination. In some embodiments, the processing of the images may include one, two, or more, among others, for reducing resolution, for example using a pyramid filter, adjusting color, for example altering or applying white balance, separating colors, for example by applying a de-Bayer filter, and adjusting brightness or contrast. The processing may also include one or more of applying a region-of-interest or frame-of-interest filter, to flag frames containing a 1D barcode, 2D barcode, or some other item of interest, detecting motion, detecting item substitution, detecting and removing image portions, such as a background and hand and arms of a cashier included in an image, and other processing.

In these and some other embodiments, the scanner 208 may sort images by evaluating metadata associated with each image. The metadata may be stored in memory in image headers. Metadata for sorting purposes may include camera source and location, exposure parameters, illumination, for example on/off or red/white, camera type (e.g., color or monochrome), image type (e.g., color or monochrome), resolution (e.g., 1280×960, 640×480, 320×240 and color or monochrome pixels), cropping (e.g., the region of interest around a one-dimensional barcode), time, and previous image processing results (e.g., one-dimensional frame of interest, two-dimensional frame of interest, motion detected, etc.).

In some embodiments, the scanner 208 can further sort images according to target frame rates. For example, if the target processing service needs a fixed frame rate of four frames per second, the scanner 208 can use a timer to only select one image every 0.25 seconds.

Some embodiments may also reduce processor 222 load by processing and sorting images in a centralized task to minimize duplication of processor 222 usage for the same task. For example, if a UNCI video streaming process needs 640×480 black & white images at a rate of sixteen frames per second, and an ONVIF video-over-Ethernet service needs 640×480 black & white images at a rate of 4 frames per second, the centralized task will process images at the 16 frame per second for the UVC process, and provide every fourth frame to the ONVIF process.

In some further embodiments, the scanner 208 presents the processed and sorted images to each of the desired services for further action. These services may include one or more of, among others, reading one and two dimensional barcodes on printed paper, products, and mobile devices (e.g., smartphones, smartwatches, tablets, etc.), reading DIGIMARC codes, detecting fraud situations (e.g., item substitution fraud), identifying produce for picklist reduction algorithms, providing video-over-USB (UVC) images and streaming video, and providing video-over-Ethernet (ONVIF) images and streaming video.

In some embodiments, the scanner 208 alternates images taken using natural illumination and auto-exposure, with images taken using bright LED illumination from the scan field lighting 220 and fixed-exposure. The auto-exposed images may provide an overall view of a checkout lane and may be used to provide video security images over Ethernet to a network video recording system (NVR). The fixed-exposure images may provide a brightly illuminated, localized view of items as they are scanned, and may be used to read one and two dimensional barcodes.

Figure 3:
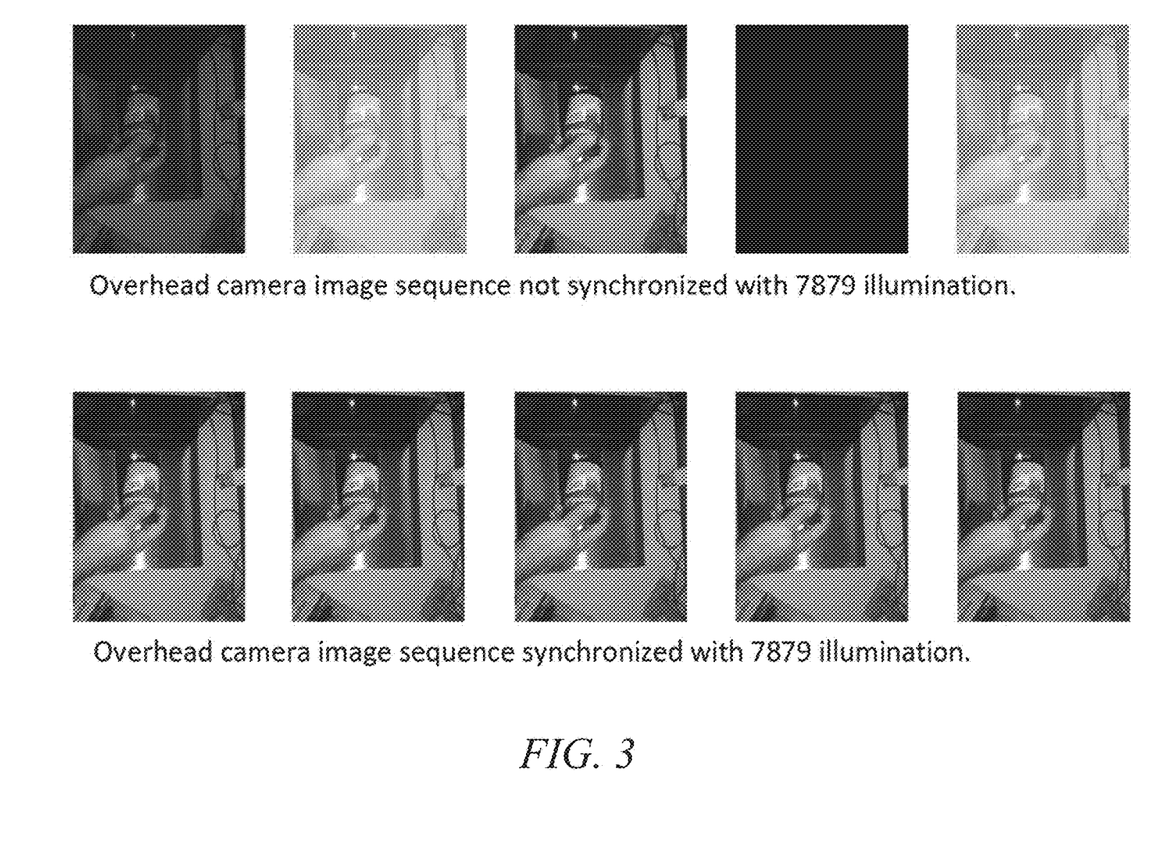
FIG. 3 includes two series of images captured by an imagining device with lighting and exposure setting manipulations, conventionally and according to an example embodiment.

FIG. 3 includes two series of images captured by an imagining device with lighting and exposure setting manipulations, conventionally and according to an example embodiment.

In situations where the work area is a product scanner scan-field, an issue is that high-performance imaging product scanners, such as the barcode scanners like the REALSCAN 7879 BI-OPTIC IMAGER available from NCR Corporation of Duluth, Ga. require bright, rapidly pulsing, localized illumination to capture 1D and 2D barcodes. This illumination causes image pulsing and flickering when viewed through conventional overhead cameras. Conventional cameras include UVC webcams, video-over-Ethernet security cameras, and the like. This pulsing and flickering is annoying to humans, and interferes with imaging algorithms that execute against captured images for purposes of fraud and theft detection. For example, see the top row of images in FIG. 3. The illumination in each of the five images is inconsistent and flickering.

Barcode scanning algorithms typically need images that are highly consistent from frame to frame. The images must not be affected by ambient store light, which varies from store to store, and from minute to minute. Image brightness and color accuracy must be constant. The best way to accomplish this is to provide intense and localized LED camera illumination, which overwhelms and effectively cancels variations in ambient light. To avoid eye discomfort and comply with safety regulations, this illumination needs to pulsed on and off in synchronization with scanner camera exposure. This reduces the effective percentage of time that the light is on, which reduces the apparent brightness to the human eye.

Some product scanners already provide such localized illumination for 1D and 2D barcode scanning. However, conventional overhead cameras cannot synchronize with the product scanner's illumination pulsing resulting in overhead camera image flicker such that the overhead images are generally unusable. At the same time, if the overhead camera were to provide its own illumination, the overhead camera illumination will similarly interfere with product scanner barcode scanning.

Various embodiments therefore integrate a remote overhead camera with the product scanner or other workspace illumination source such that the overhead images do not flicker. Some embodiments may also include the overhead camera utilizing an illumination system of the product scanner to control image quality and color rendering by adjusting lighting parameters. For example, some embodiments temporality change illumination behavior of the illumination source when the overhead camera needs a flicker-free, color accurate image, such as illustrated in the bottom row of images in FIG. 3. In some other example embodiments, one or more overhead cameras continuously synchronize exposure and illumination through wired or wireless communication. The wired communication may be a one, two, four, or other number of wires that connect each of the one or more cameras to a control module that is also coupled to the lighting. Wireless communication may be conducted via near-field communication (NFC), BLUETOOTH®, WI-FI®, or other radio-based communication technology. The wireless communication may also be optical in some embodiments. In such embodiments, an overhead camera may optionally shift its exposure time window to overlap with illumination pulses and provide a localized view of the scan-field, or to avoid certain illumination pulses and provide a larger generalized view. The synchronization may be performed via the corresponding communication means of the particular embodiment.

Returning now to FIG. 2, one or both of the cameras 240, 242 may be placed above the scanner 208 such as to provide overhead images. The firmware 226 or software 230 may provide control module functions to the scanner 208 and in doing so, temporality adjust illumination from the scan-field lighting 220 to allow one or both of the cameras 240, 242 to capture images at certain times or at certain frame rates. This may include illuminating lights of certain colors at certain intensities to provide enable capturing of color-accurate images. This may also include turning off all lighting such that an auto-exposure setting of one or both of the cameras 240, 242 can be used. The cameras 240, 242 in such embodiments may be off-the-shelf webcams.

In some such embodiments, the firmware 226 or software 230 of the scanner 208 or a process on a terminal, such as terminal 104 of FIG. 1, to which the scanner 208 is coupled, determines that an overhead view of the scan zone is needed. For example, in a self-checkout embodiment, the customer may have placed bananas on the scanner 208 scale 210 top plate for weighing, and pressed a terminal screen button labeled "select produce." The terminal may then send a command to the scanner 208 instructing the scanner 208 to turn off its illumination from the scan field lighting 220 and to capture and return an overhead camera 240, 242 image to the terminal. The scanner 208 captures the image and returns the image to the terminal, which then processes the image. For example, the terminal may determine that the item on the scanner 208 scale 210 top plate is bananas based on color and shape, and then prompt the customer to press a terminal screen button labeled "Yes, this item is bananas." or to select a particular variety of bananas (e.g., organic or otherwise). The terminal may then send a command to the scanner 208 to turn its illumination back on. Note however that in some embodiments the scanner 208 may automatically turn its illumination back on after returning the image to the terminal. Additionally, one or both of the cameras 240, 242 may instead be connected or otherwise communicate directly with the terminal or operate independently of the terminal.

In another embodiment, the scanner 208 and overhead camera(s) 240, 242 may continuously synchronize exposure and illumination by electrical, radio, or optical means. Such embodiments do not disrupt scanning and provides continuous images while taking full advantage of localized scanner 208 illumination from the scan-field lighting 220. In some such embodiments, the overhead camera(s) 240, 242 may be custom designed to be integrated in such as manner for lighting synchronization with the scanner 208 or other lighting source.

In some of these embodiments, the terminal, such as terminal 104 of FIG. 1, or scanner 208 determines that an image of the overhead view of the scan-field is needed. For example, in a self-checkout system, the customer may have placed some bananas on the scanner 208 scale 210 top plate for weighing and pressed a terminal screen button labeled "select produce." The terminal may then send a command to the scanner 208 to capture and send an overhead camera 240, 242 image to the terminal. The overhead camera 240, 242 is synchronized with the scanner 208 scan-field lighting 220. An image is then captured by the camera 240, 242, provided to the firmware 226 or software 230 process of the scanner 208 or directly to the terminal. Regardless, the terminal eventually receives the image and then processes the image. For example, the terminal may determine, from the processing of the image, that the item on the scanner 208 scale 210 top plate is bananas based on color and shape, and then prompt the customer to press a terminal screen button labeled, "Yes this item is bananas."

This embodiment requires synchronizing the overhead camera 240, 242 with the scanner 208 scan-field lighting 220. To perform this synchronization, the scanner 208 may provide a sync output to the overhead camera via a dedicated electrical wire pair. The scanner 208 may be the "master" device for providing frame sync. The sync signal may be a pulsed signal from 0V to 5V in some embodiments that indicates when to start a next exposure based on a change in the signal.

In some other instances of such embodiments, the camera 240, 242 may "free run" at approximately a same frame rate as the scanner 208. The scanner 208 may monitor the timing of images sent from the camera 240, 242 to the scanner 208 and actively synchronize the phase of the camera 240, 242. In some such embodiments, the camera 240, 242 repeatedly triggers its imaging chip to start the next exposure at a frame rate equal to that of the scanner 208. The camera 240, 242 trigger has an adjustable phase delay. For example, if the frame rate is 25 frames per second, then the phase delay might be adjustable from 0 to 0.04 seconds. The scanner 208 measures the difference between the arrival time of the images from the camera 240, 242, and the exposure start time for the imaging devices 218 (i.e., cameras) inside the scanner 208. If the difference is greater than a threshold, then the scanner 208 may send a command to the camera 240, 242 instructing the camera 240, 242 to adjust its phase delay to reduce the difference. For example, the threshold could be 0.004 seconds. If the scanner 208 determines that the camera 240, 242 frames are arriving 0.02 seconds before the scanner 208 imaging device 218 exposure start time, then the scanner 208 would send a command to the camera 240, 242 to increase the overhead camera phase delay by 0.02 seconds. The process then repeats to keep the synchronization. (Note that references herein to the scanner 208 performing certain actions is reference to data processing activities that are performed by execution of instructions in firmware 226, software 230 on the processor 222, or both).

The synchronization may be accomplished in some other embodiments by providing a sync output from the camera 240, 242 to the scanner 208 via a dedicated electrical wire pair. The camera 240, 242 in such embodiments is the "master" device for providing frame sync.

In some additional embodiments, the camera 240, 242 may passively sync with the scanner 208 scan-field illumination 220 by optically monitoring the scan-field. The camera 240, 242 in such embodiments may use its camera imaging chip, or a separate dedicated photodetector, to monitor the scan-field. The camera 240, 242 may perform image or signal processing on the scan-field image data to extract a sync signal from the scan-field illumination. In some embodiments, the passive synching may include an installer running a software utility on the terminal that shows a "live" view from the overhead camera 240, 242. If the overhead camera uses the image sensor for detecting frame sync, the software utility allows the installer to draw a box around, or mouse-click or tap in the middle of, the scanner 208 scan-field. The location of the scan-field within the camera image may then be stored in the camera 240, 242 for later use. However, if the camera 240, 242 uses a dedicated fixed optical detector, the installer uses the live view to aim the overhead camera 240, 242 so that the optical detector is in the middle of the scanner 208 scan-field. The camera 240, 242 in such embodiments then continuously performs image processing on the images, or performs signal processing on the signal from the fixed optical detector, to determine the phase and frequency of the scan-field illumination from the scan-field lighting 220. If the camera 240, 242 uses the image sensor for detecting frame sync, the camera 240, 242 limits its image processing to the defined area as described above. The overhead camera 240, 242 then synchronizes its exposure with the phase and frequency of the scanner 208 scan-field illumination and the process repeats to maintain synchronization thereby forming a phase locked loop.

Figure 4:
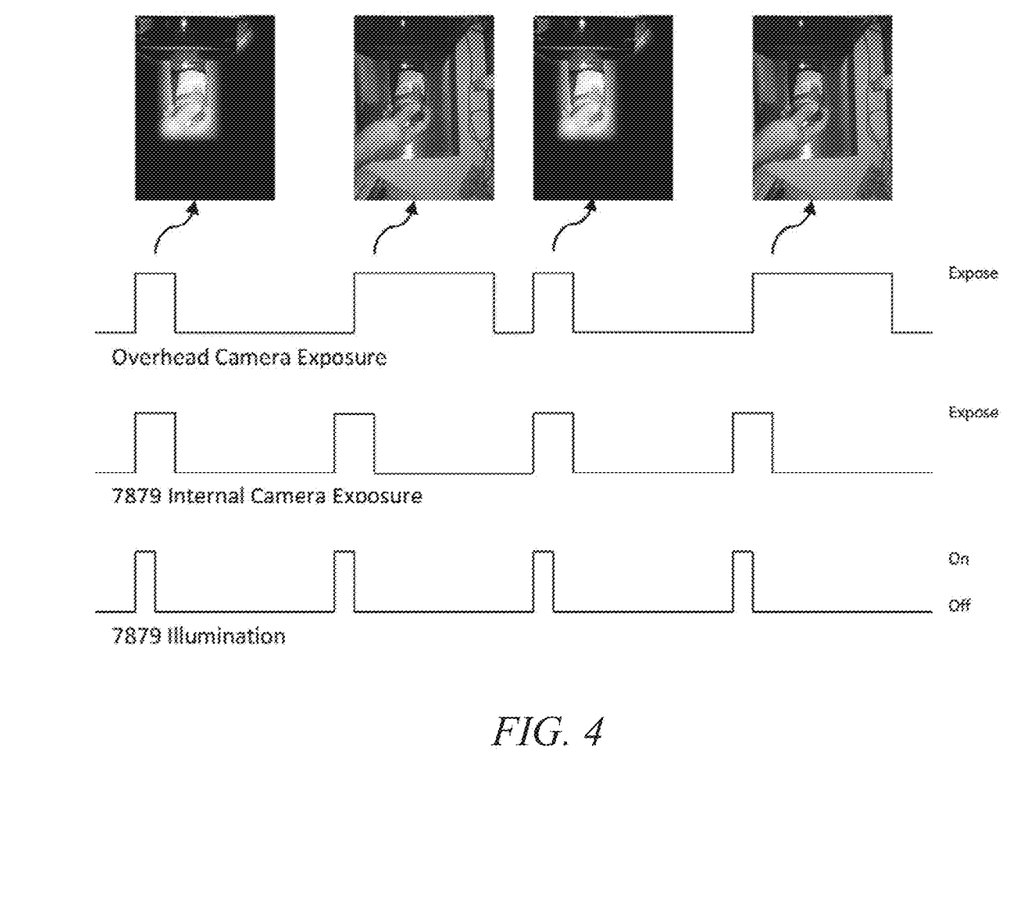
FIG. 4 includes a series of images captured by an imaging device with lighting and exposure settings as illustrated.

FIG. 4 includes a series of images captured by an imaging device with lighting and exposure settings as illustrated. An overhead camera(s) may be called upon in some embodiments to alternate images captured with and without illumination. Images captured with illumination show the scan zone in sharp contrast to the background, and are more consistent in brightness and color. Such images are useful for scanning barcodes and for some fraud and theft detection image analytics. Images captured without illumination show the general scene around the scan-field, but are typically inconsistent in brightness and color. Such images are useful for security monitoring. As shown in FIG. 4, the camera can control whether it captures images with or without scan-field illumination by phase shifting camera exposure time relative to the scan-field illumination.

Figure 5:
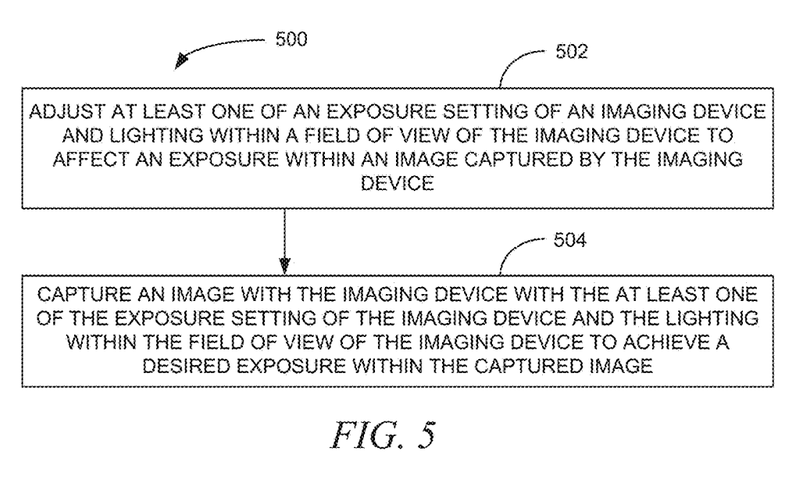
FIG. 5 is a logical block flow diagram of a method, according to an example embodiment.

FIG. 5 is a logical block flow diagram of a method 500, according to an example embodiment. The method 500 is an example of a method that may be performed on one or more of a product scanner, a terminal, a kiosk, within a camera, or on a combination thereof. The method 500 includes adjusting 502 at least one of an exposure setting of an imaging device and lighting within a field of view of the imaging device to affect an exposure within an image captured by the imaging device. The method 500 further includes capturing 504 an image with the imaging device with the at least one of the exposure setting of the imaging device and the lighting within the field of view of the imaging device to achieve a desired exposure within the captured image.

In some embodiments, the adjusting 502 and capturing 504 are performed at a frequency at which a process is to receive images, such as a theft or fraud detection process, a security video recording process, and the like. In some such embodiments, the method 500 includes forwarding the captured image to the process. Such embodiments may also include returning at least one of the imaging device and the lighting that were adjusted to either an original state or a next state in a sequence of states for capturing images.

The imaging device, in some embodiments of the method 500, is one of a plurality of imaging devices of, coupled to, or in communication with a product scanner. Also, the lighting may include at least one scan-area lighting element of the product scanner. In some embodiments, adjusting 502 lighting within the field of view of the imaging device includes turning off lighting from all scan-area lighting elements of the product scanner.

In some other embodiments of the method 500, adjusting 502 at least one of the exposure of the imaging device and lighting within the field of view of the imaging device includes continuously synchronizing both the exposure and the lighting. Adjusting 502 at least one of the exposure of the imaging device and lighting within the field of view of the imaging device may also or alternatively include sending a signal via a wire from a device controlling the lighting within the field of view of the imaging device and the imaging device. In a further embodiment, adjusting 502 at least one of the exposure of the imaging device and lighting within the field of view of the imaging device includes sending a signal via a sequence of light pulses from the lighting to the imaging device, the signal instructing the imaging device of at least one of a frame rate and an exposure setting to capture one or more images.

Capturing 504 the image with the imaging device in the method 500 may include receiving the image from the imaging device. Some such embodiments further include transmitting the image via a network to a video recording process that stores the image as a video frame.

Figure 6:
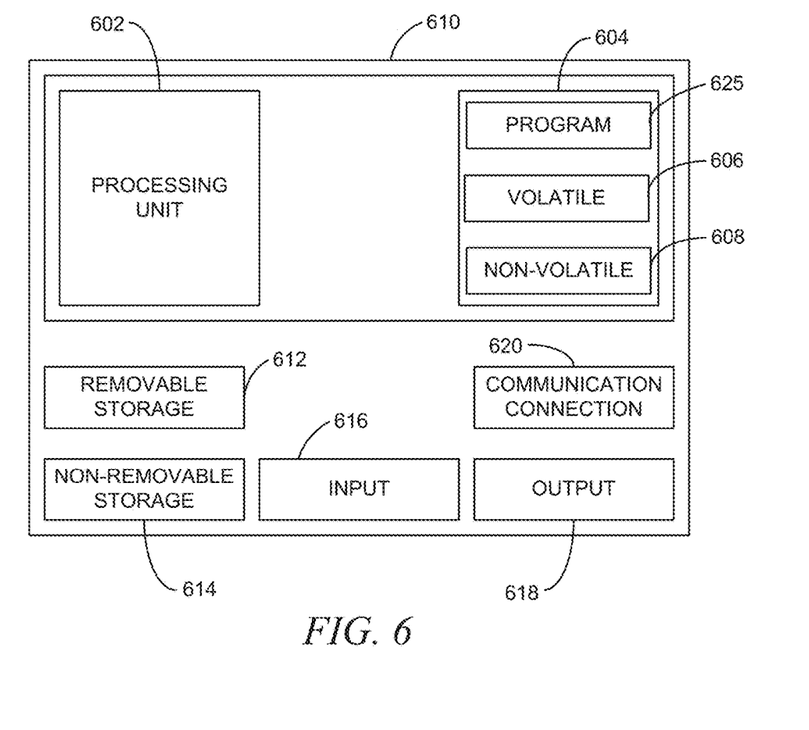
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
adjusting at least one of an exposure setting of an imaging device and lighting within a field of view of the imaging device to affect an exposure within an image captured by the imaging device;
capturing an image with the imaging device with the at least one of the exposure setting of the imaging device and the lighting within the field of view of the imaging device to achieve a desired exposure within the captured image; and wherein the adjusting and capturing are performed at a frequency at which a process is to receive images, the adjusting further including adjusting a phase of the imaging device to actively synchronize a frame rate of the imaging device with the scanner.

2. The method of claim 1, further comprising, forwarding the captured image to the process.

3. The method of claim 2, further comprising:
returning at least one of the imaging device and the lighting that were adjusted to either an original state or a next state in a sequence of states for capturing images.

4. The method of claim 1, wherein:
the imaging device is one of a plurality of imaging devices of, coupled to, or in communication with a product scanner; and
the lighting includes at least one scan-area lighting element of the product scanner.

5. The method of claim 4, wherein the imaging device is mounted above the product scanner.

6. The method of claim 4, wherein adjusting lighting within the field of view of the imaging device includes turning off lighting from all scan-area lighting elements of the product scanner.

7. The method of claim 1, wherein adjusting at least one of the exposure of the imaging device and lighting within the field of view of the imaging device includes continuously synchronizing both the exposure and the lighting.

8. The method of claim 1, wherein adjusting at least one of the exposure of the imaging device and lighting within the field of view of the imaging device includes sending a signal via a wire from a device controlling the lighting within the field of view of the imaging device and the imaging device.

9. The method of claim 1, wherein adjusting at least one of the exposure of the imaging device and lighting within the field of view of the imaging device includes sending a signal via a sequence of light pulses from the lighting to the imaging device, the signal instructing the imaging device of at least one of a frame rate and an exposure setting to capture one or more images.

10. The method of claim 1, wherein capturing the image with the imaging device includes receiving the image from the imaging device, the method further comprising:
transmitting the image via a network to a video recording process that stores the image as a video frame.

11. The method of claim 1, wherein the imaging device is a network-enabled video camera.

12. A system comprising:
a product scanner including at least one imaging device and a light-field that illuminates a scan-area;
an overhead imaging device to be positioned to provide an overhead view of the scan-area of the product scanner; and
a control module that controls operation of the product scanner and the overhead imaging device by performing data processing activities comprising:
adjusting at least one of an exposure setting of the overhead imaging device and lighting of the product scanner light-field to affect an exposure within an image captured by the overhead imaging device; and
capturing an image with the overhead imaging device with the at least one of the exposure setting of the overhead imaging device and the lighting product scanner light-field to achieve a desired exposure within the captured image; and
wherein the adjusting and capturing are performed at a frequency at which a video recording process is to receive images, the data processing activities further comprising:
forwarding the captured image to the process; and
returning at least one of the imaging device and the lighting that were adjusted to either an original state or a next state in a sequence of states for capturing images.

13. The system of claim 12, wherein adjusting lighting of the product scanner light-field includes turning off the lighting.

14. The system of claim 12, wherein adjusting at least one of the exposure of the overhead imaging device and lighting of the product scanner light-field includes continuously synchronizing both the exposure and the lighting.

15. The system of claim 14, wherein the synchronizing is performed by a process that executes on the overhead imaging device sensing light pulse signals output by control module from the lighting of the product scanner.

16. The system of claim 12, wherein adjusting at least one of the exposure of the imaging device includes sending a synchronizing signal to the overhead imaging device.

17. The system of claim 12, wherein the synchronizing signal is sent via a wired connection between the control module and the overhead camera.

18. The system of claim 12, wherein the control module is integrated within the product scanner.

* * * * *